United States Patent
Hind et al.

(10) Patent No.: US 7,457,946 B2
(45) Date of Patent: Nov. 25, 2008

(54) METHOD AND PROGRAM PRODUCT FOR PRIVATELY COMMUNICATING WEB REQUESTS

(75) Inventors: John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/273,341

(22) Filed: Oct. 17, 2002

(65) Prior Publication Data

US 2004/0078593 A1    Apr. 22, 2004

(51) Int. Cl.
*H04L 9/00* (2006.01)

(52) U.S. Cl. .................. 713/153; 713/154; 713/160; 713/162

(58) Field of Classification Search .......... 713/153, 713/154

See application file for complete search history.

(56) References Cited

U.S. PATENT DOCUMENTS

| | | | |
|---|---|---|---|
| 6,266,704 B1 * | 7/2001 | Reed et al. | 709/238 |
| 6,502,135 B1 * | 12/2002 | Munger et al. | 709/225 |
| 6,591,291 B1 * | 7/2003 | Gabber et al. | 709/206 |
| 6,678,822 B1 * | 1/2004 | Morar et al. | 713/182 |
| 6,952,769 B1 * | 10/2005 | Dubey et al. | 713/153 |
| 6,986,036 B2 * | 1/2006 | Wang et al. | 713/153 |
| 2003/0191802 A1 * | 10/2003 | Zhao et al. | 709/203 |

OTHER PUBLICATIONS

Reiter et al; "Crowds: anonymity for Web Transactions"; Nov. 1998; ACM Transactions on Information and System Security (TISSEC); vol. 1, Issue 1; pp. 66-92.*
Reed et al.; "Anonymous connections and onion routing"; May 1998; Selected Areas in Communications, IEEE Journal on, vol. 16, Issue 4; pp. 482-494.*
Syverson et al; "Towards an Analysis of Onion Routing Security"; 2001; Designing Privacy Enhancing Technologies; pp. 96-114.*
Shields et al; "A Protocol for Anonymous Communication Over the Internet"; 2000; Proceedings of the 7th ACM Conference on Computer and Communications Security; pp. 33-42.*
Schneier, Bruce; Applied Cryptography; 2nd Edition; John Wiley & Sons, Inc.; 1996; Chapter 2.*
www.kqmlmix.net, Author Unknown, Date Unknown, pp. 1-2.
www.anonymizer.com, Author Unknown, Date Unknown, pp. 1-2.
"Covering Tracks: New Privacy Hope for P2P", by John Borland, Staff Writer, CNET News.com, http://news.com.com/2100-1027-5164413.html, Feb. 25, 2004.

* cited by examiner

*Primary Examiner*—Jung Kim
(74) *Attorney, Agent, or Firm*—Jeanine S. Ray-Yarletts; Hoffman Warnick LLC

(57) ABSTRACT

The present invention provides a method and program product for randomly relaying a protected web request from a client, through a set of peers, to a privacy proxy. Once received, the web request is proxied to a web services provider. When a provider reply is received by the privacy proxy, it is protected and relayed back through a set of peers to the client.

7 Claims, 3 Drawing Sheets

METHOD AND PROGRAM PRODUCT FOR PRIVATELY COMMUNICATING WEB REQUESTS

BACKGROUND OF THE INVENTION

1. Field of the Invention

The present invention generally relates to network privacy. More specifically, the present invention relates to a method, system and program product for privately communicating web requests.

2. Background Art

As the use of networks such as the world wide web becomes more popular, network privacy is becoming an increasing concern. Specifically, many web users are frequently transmitting confidential information over the web in an effort to conduct a commercial transaction. Such information could include personal information such as the user's name and social security number as well as technical information such as the IP address of the user's computer. In many cases, much of the information transmitted with a web request to a web services provider is not needed to complete the transaction. For example, if a user is ordering an article of clothing, it may not be necessary for the web services provider (e.g., EDDIE BAUER) to know the user's IP address or social security number to complete the transaction. Including such information only increases the risk to the user.

These concerns are heightened when the web request is relayed through other systems en route to the web services provider. In particular, an emerging practice in web communication is to consult with a web services provider directory such as a Universal Description, Discovery and Integration (UDDI) Directory, which may be an XML registry for businesses and invocable Web Services listed on a network such as the Internet. The web services provider directory (hereinafter sometimes called a "provider directory") may be compared with a "telephone" directory for businesses and service-providers to be listed by name, product, location or the web services they offer, but unlike a telephone directory may include the technical information needed to invoke computer-based Web Services programmatically, such as supported protocols (e.g., SOAP over HTTP), invocation style (e.g., remote procedure call) and parameters (e.g., a callback address to post further messages). The provider directory can resolve a web services request to a specific web services provider. However, communicating with a third party system such as a provider directory introduces additional privacy exposure into the system. Specifically, just like the web services provider ultimately receiving the web services request, any private information contained in the web services request is also exposed at the provider directory. This increases the probability that hackers can obtain the private information.

Even in cases where the information on a web services request—such as a customer name or delivery address—is legitimately needed by a recipient to perform a service, a further privacy concern arises. A third party eavesdropping on web traffic, or a malicious individual who obtains historical records of transactions performed by a web services provider or queries made to a provider directory, could learn a great deal about the individual making web services requests by analyzing a pattern of requests over time (if the requests contain sufficient personal identifying information to correlate one request with another). This problem becomes more acute if the third party or malicious individual obtains records from several web services providers and/or directories and is able to correlate personal identifying information across multiple sources.

"Data mining" involves piecing together numerous attributes about a person into a rather complete demographic profile of that person. This can include many items of precise personal data gleaned from various sources and cross-checked and correlated across those sources. Such "data mining" operations are today routinely conducted by credit card companies and others in order to target individuals for marketing purposes. The larger a body of data about a person that can be assembled for analysis, the more successful the data mining operation is likely to be in gleaning many particulars about that person.

As the emerging use of Web Services and provider directories promises to significantly increase the amount of personal information potentially available for data mining, the possibility that data mining could become even more intrusive raises privacy concerns to a new level. Even information not overtly revealed in individual web services requests could be inferred from a pattern of requests. For example, one could infer that a person suffers from a particular medical condition if the person queries a directory for a bookstore selling books about that medical condition, and then queries a directory for a pharmacy selling medicine for that condition. The resulting inference—whether accurate or inaccurate—could be used surreptitiously, without the individual's consent, to compromise his or her privacy, such as by denying medical insurance coverage or targeting the individual for unwanted advertising.

Heretofore, many attempts have been made to address privacy concerns over a network. To this extent, anonymizer products such as "anonymizer.com" attempt to conceal a user's IP identity by tunneling requests through a proxy to destination web servers. Although such products may help conceal the origin of the requests from the destination web servers, they still require that the proxy know, or have access to, such information. Thus, confidential information is still available, should a hacker compromise the proxy. In addition, many anonymizer products simply require the user to establish an ISP account without the usual identifying information (e.g., via anonymous money order, etc.). Such systems fail to protect data in transit or block the caller-id of the user's telephone number used for dial-up access to the network. Accordingly, the user's information is still exposed to great risk. Such systems do little to disguise the pattern of requests from which certain private personal information could be inferred.

Thus, individuals are rightfully concerned about protecting their privacy when surfing the Web, querying directories, and making Web Services requests, and new solutions are needed to these problems.

In view of the foregoing, there exists a need for a method, system and program product for privately communicating web requests. A need exists whereby identifying data in a web request is protected (e.g., encrypted and/or obscured) before leaving the user's system (client). Moreover, a need exists for a protected web services request to be randomly relayed to a privacy proxy through a set of echo peers. A further need exists for the privacy proxy to proxy the web services request (e.g., to a provider directory and/or an appropriate web services provider). Another need exists for a reply received from a web services provider to be protected by the privacy proxy, and then relayed back to the user in a secure fashion.

SUMMARY OF THE INVENTION

In general, the present invention provides a method and program product for privately communicating web requests, which may be Web Services requests (hereinafter, the term "web requests" will be used inclusively to mean any type of request made over the web, including Web Services requests). Specifically, under the present invention, a web request is created and protected on a computer user's system (i.e., on a client). Protection of the web request generally includes optional obscuring of the data within the request, and encryption with a key. Once protected, the web request is randomly relayed to a privacy proxy through a set of echo peers according to a hop count. "Echo peers" or "peers," as used herein, refers to computers performing a peer-to-peer relay according to the present invention. The hop count identifies a quantity of peers in the set of peers that the web request will traverse to reach the privacy proxy. Once received on the privacy proxy, the web request is decrypted, and proxied. Specifically, the web request can be first proxied to a provider directory in an effort to identify an appropriate web services provider. "Provider directory" or "web services directory," as used herein, refers to a service capable of resolving a generic web request to a specific instance that can provide the requested service. Once an appropriate web services provider is identified, the web request is proxied thereto. The web services provider's reply is later received by the privacy proxy, encrypted, and relayed back to the client. Upon receipt, the client decrypts the reply and can un-obscure any data (if necessary).

According to a first aspect of the present invention, a method for privately communicating web requests is provided. The method comprises: (1) obscuring a web request on a client, wherein the obscuring includes substituting at least a value for at least a confidential string of data in a data payload portion of the web request; and randomly relaying the web request to a privacy proxy through a set of peers; (2) initiating a communication from the client to a privacy proxy, wherein the communication includes a hop count and an SSL initiation message, and wherein the hop count identifies a quantity of peers in a set of peers through which the web request is randomly relayed; (3) establishing a full duplex channel between the privacy proxy and the client; (4) encrypting a data payload portion of the web request on a client with a symmetric key; (5) subsequent to the encrypting, randomly relaying the web request to the privacy proxy along the established channel independently of the hop count and the symmetric key; (6) decrypting the web request on the privacy proxy; (7) automatically proxying the web request from the privacy proxy to a corresponding web services provider; (8) proxying the web request to a provider directory, prior to automatically proxying the web request to the corresponding web services provider; (9) receiving a directory reply on the privacy proxy, wherein the directory reply identifies the corresponding web services provider; (10) receiving and encrypting, on the privacy proxy, a provider reply received from the corresponding web services provider; (11) relaying the provider encrypted reply to the client through the set of peers; and (12) decrypting the provider reply on the client.

According to a second aspect of the present invention, a program product stored on a computer-readable medium for privately communicating web requests is provided. When executed, the program product performs the following steps: (1) creating a web request on a client; (2) protecting the web request on a client, wherein the protecting includes using a symmetric key and obscuring data wherein the obscuring includes substituting at least a value for at least a confidential string of data in a data payload portion of the web request; (3) initiating a communication from the client to a privacy proxy, wherein the communication includes a hop count and an SSL initiation message, wherein the hop count identifies a quantity of peers in the set of peers; (4) establishing a full duplex channel between the privacy proxy and the client; (5) randomly relaying the web request to the privacy proxy along the established channel independently of the hop count and the symmetric key; (6) proxying the web request from the privacy proxy to a provider directory; (7) receiving a directory reply that identifies a corresponding web services provider; and (8) automatically proxying the web request from the privacy proxy to the corresponding web services provider.

Therefore, the present invention provides a method and program product for privately communicating web requests.

BRIEF DESCRIPTION OF THE DRAWINGS

These and other features of this invention will be more readily understood from the following detailed description of the various aspects of the invention taken in conjunction with the accompanying drawings in which.

Figure 1:
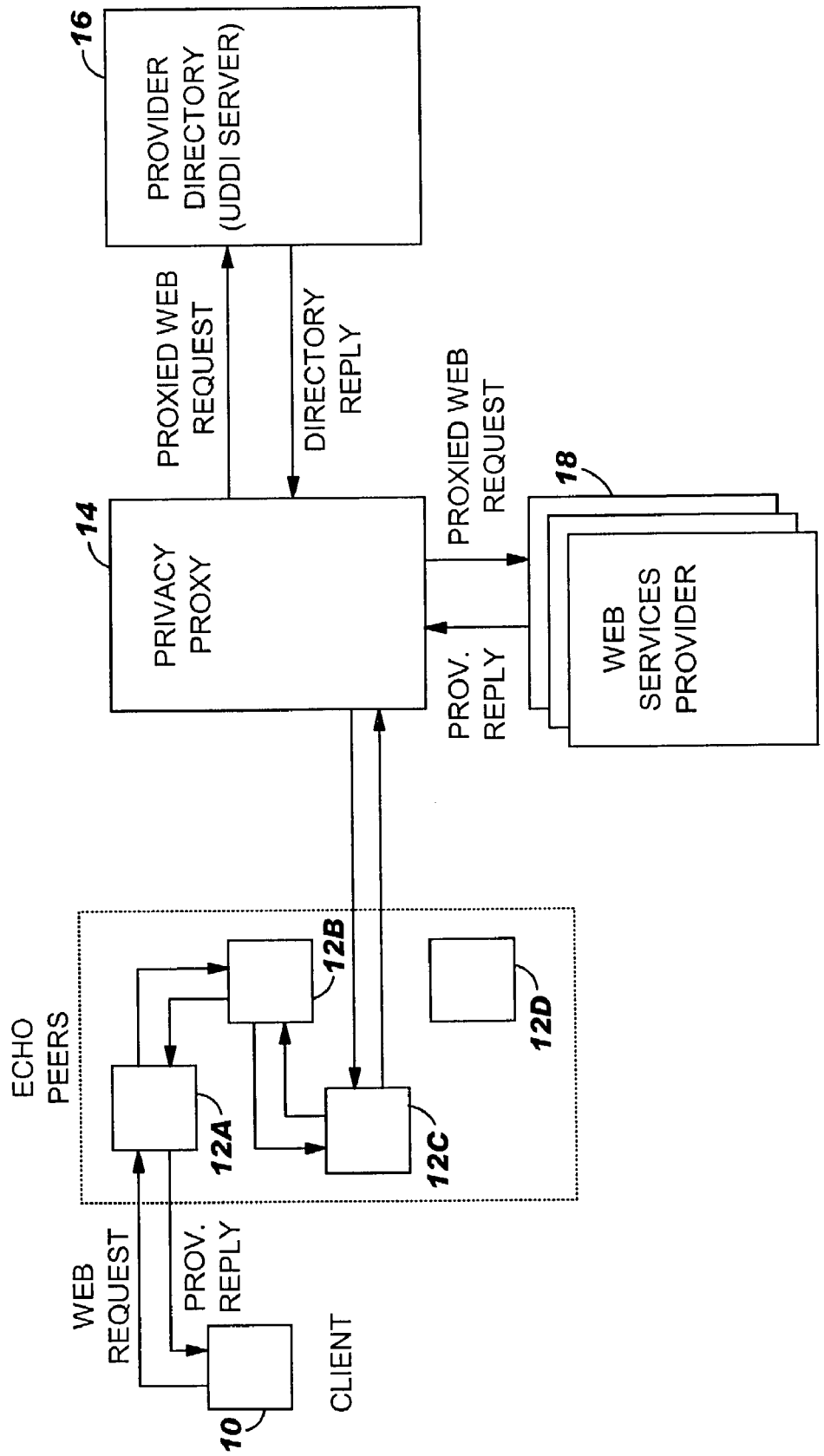
FIG. 1 depicts a system for privately communicating web requests according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for privately communicating web requests. Specifically, under the present invention, a web request is created and protected on a computer user's system (i.e., on a client). Protection of the web request generally includes optional obscuring of the data within the request, and encryption with a key. Once protected, the web request is randomly relayed to a privacy proxy through a set of echo peers according to a hop count. The hop count identifies a quantity of peers in the set of peers that the web request will traverse to reach the privacy proxy. Once received on the privacy proxy, the web request is decrypted, and proxied. Specifically, the web request can be first proxied to a provider directory in an effort to identify an appropriate web services provider. Once an appropriate web services provider is identified, the web request is proxied thereto. The web services provider's reply is later received by the privacy proxy, encrypted, and relayed back to the client. Upon receipt, the client decrypts the reply and can un-obscure any data (if necessary).

Referring now to FIG. 1, the private communication of a web request under the present invention is shown. As depicted, a web request is generated and transmitted from a client 10. Prior to transmission, the data in the web request is optionally obscured and then encrypted. Obscuring is done by substituting values for various "confidential" or "private" strings of data, generally within the data payload portion of the message, in such a manner that when inspecting a series of requests received by a recipient, a series of requests made by the same requester cannot easily be correlated to a particular person or inferred to be the same requester. For example, on a first request the user's name could be changed from "Mike Jones" to "Joe Smith" and on a second request, the user's name could be changed to "Ann Day." Moreover, the IP address of client 10 could be masked in a similar fashion or even eliminated from the web request. In any event, after the data is obscured (if at all), it is then encrypted with an encryption key. Encryption of the web request can be achieved in any known manner.

Figure 2A:
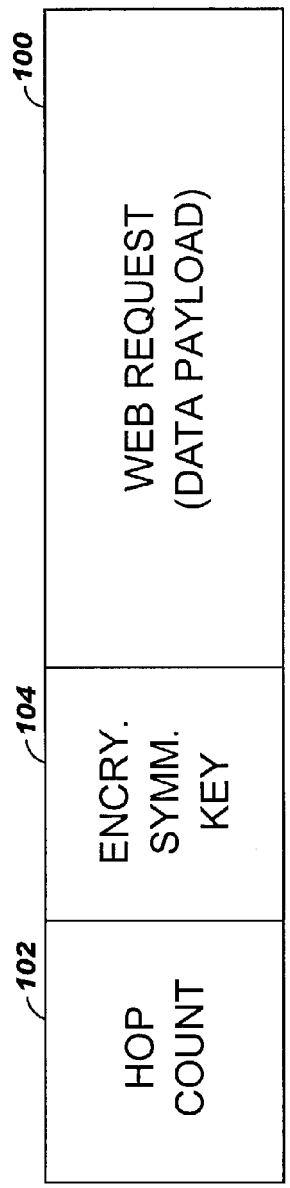
FIG. 2A depicts an exemplary packaged web request according to one embodiment of the present invention.

In a first embodiment, the data in the web request is encrypted with a randomly selected symmetric encryption key, which itself is encrypted with a public key of an asymmetric public key—private key pair, wherein the private key is known only to the intended decrypter. The public key can be obtained from privacy proxy 14 when client 10 registers with privacy proxy 14, as will be further described below, or through other well known means such as from an LDAP directory. As shown in FIG. 2A, once the web request 100 has been protected in this manner, it is packaged with the hop count 102 and the encrypted symmetric key 104. As will be further described below, hop count 102 identifies a quantity of echo peers that the web request must traverse to reach privacy proxy 14.

Figure 2B:
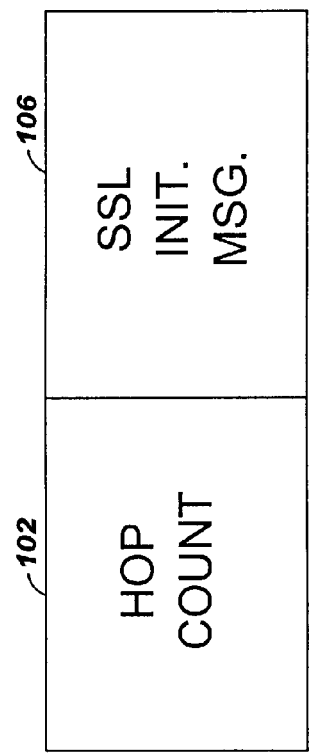
FIG. 2B depicts an initial SSL communication according to another embodiment of the present invention.

Under another embodiment, encryption may be accomplished according to a variant of well-known Secure Sockets Layer (SSL) encryption protocols. Under this SSL variant, as shown in FIG. 2B, an initial communication that includes hop count 102 and "hello" or SSL initiation message 106 (no web request payload) is relayed from client 10 to privacy proxy 14. Once received by privacy proxy 14, a full duplex channel between privacy proxy 14 and client 10 (i.e., through echo peers 12A-D) is established. Using the established channel, a symmetric key can be negotiated using known SSL algorithms. Then, any data packets (payload) for the web request are encrypted with the negotiated symmetric key, and relayed along the established channel. Thus, under this SSL variant, there is no need to package and relay the encrypted symmetric key from client 10 to privacy proxy 14. Moreover, once hop count 102 is established in the first communication, there is no need to for it to be relayed again.

Referring back to FIG. 1, once protected (and possibly packaged, depending on the encryption method utilized), the protected web request will be randomly communicated (i.e., relayed) to privacy proxy 14 through a set 12A-C of echo peers 12A-D. Specifically, echo peers 12A-D provide the random path that the protected web request will take en route to privacy proxy 14. Under the present invention, the protected web request can be relayed through any quantity of echo peers 12A-D. In the example shown, the protected web request has been relayed through echo peers 12A-C, but not echo peer 12D. As described above, the quantity of echo peers through which the protected web request is relayed is identified in the hop count. Specifically, if the hop count is "0," a echo peer receiving the protected web request will relay the same directly to privacy proxy 14. If the hop count is greater than "0," an echo peer receiving the protected web request will decrement the hop count by "1," and pass the protected web request to another randomly selected echo peer. Thus, the original hop count for the example shown in FIG. 1 was "2." That is, echo peer 12A received the protected web request with a hop count of "2," decremented it to "1," and forwarded the protected request to echo peer 12B. Echo peer 12B then decremented the hop count to "0," and forwarded the protected web request to echo peer 12C. Peer 12C then forwarded the protected web request directly to privacy proxy 14 (i.e., because the hop count was "0" when the protected web request was received by peer 12C). By randomly relaying the protected web request through a set of peers, privacy proxy 14 has no way of discerning the true origin of the web request (i.e., because even if the hop count is "0," the web request will always pass through at least one echo peer before being received by privacy proxy 14). Moreover, because the web request was protected during the relaying process, none of the echo peers 12A-C that relay the web request can compromise the information therein.

In a typical embodiment of the present invention, echo peers 12A-D could represent the same or similar system as client 10. That is, client 10 could be another registered "echo peer" for relaying a web request. For example, client 10 could relay a web request from echo peer 12A to privacy proxy 14. To this extent, each echo peer 12A-D could be operated similarly to client 10 by other web users. However, it should be appreciated that this need not be the case, and that client 10 could be a system that is distinct from echo peers 12A-D.

As indicated above, under the present invention echo peers 12A-D and/or client 10 can be made to register with privacy proxy 14 before using this web request privacy service. Upon registration; client 10 and echo peers 12A-D could be provided with a public key (to encrypt the symmetric key) as well as a list of other peers. The list of peers could be used by client 10 and echo peers 12A-D when they receive a web request from another peer for random relaying to privacy proxy 14. Optionally, client 10 and echo peers 12A-D could be made to renew their registrations so that the list of peers could be frequently updated.

In any event, when privacy proxy 14 receives the web request, the first step is to decrypt the web request. As indicated above, the web request was typically encrypted with a symmetric key. If the web request was packaged with the encrypted symmetric key (i.e., the non-SSL method described above), privacy proxy 14 decrypts the symmetric key using a corresponding private key known only to privacy proxy 14. Once decrypted, the symmetric key is used, at the privacy proxy 14, to decrypt the web request. After decryption, privacy proxy 14 "proxies" the web request to provider directory 16 and/or web services provider(s) 18. Specifically, privacy proxy 14 communicates the web request as if it originated on privacy proxy 14. In one embodiment, "proxying" of the web request can involve the generation of a new web request (e.g., by privacy proxy 14) based on the received web request, and then communicating the new web request from privacy proxy 14. Alternatively, proxying of the web request could involve the altering of certain information in the received web request to make it appear as if it originated on privacy proxy 14. In any event, the web request could optionally be proxied first to a provider directory 16, and then a directory reply received that identifies corresponding web services provider(s) 18. When such a directory reply is received, privacy proxy 14 then proxies the web request to the identified web services provider(s) 18 and waits for a provider reply. When a provider reply is received by privacy proxy 14, it is encrypted (e.g., via the same symmetric key chosen by client 10 to protect the initial web services request, via SSL, or any other suitable known means), and relayed back to client 10. Upon receipt, client 10 will decrypt the provider reply and un-obscure any obscured data therein (e.g., restore the user name, IP address, etc. to their original values in place of the substitute strings previously used for obscuration).

It should be understood that the proxying of the web request to provider directory 16 is optional and need not occur if privacy proxy 14 has already identified an appropriate web services provider 18. For example, privacy proxy 14 may have stored a list of web services providers based on previous web requests. In such a case, communication of the web request to provider directory 16 may not be necessary.

In a typical embodiment, the provider reply is relayed to client 10 along the reverse path that the web request followed (e.g., from echo peer 12C to echo peer 12B to echo peer 12A to client 10). This can be accomplished using any suitable known means. For example, when the web request is originally sent from client 10, a session could be established between the applicable echo peers 12A-C (and optionally privacy proxy 14) and maintained until the provider reply has been relayed in the reverse direction toward client 10. Alternatively, privacy proxy 14 and echo peers 12A-C could each remember the "source" from which it received the corresponding original web request, and this path could be followed in reverse. As a third alternative, a new random path for relaying the reply from the privacy proxy 14 to the client 10 through a randomly-chosen quantity of echo peers 12A-D could be established, so long as a suitable encryption method is used to protect the reply data and allow its decryption only by client 10.

By randomly relaying each web request and reply as described herein, greater security/privacy is provided. Specifically, by preventing privacy proxy 14 from knowing the true origin of the web request, less information about the requesting user is potentially available in the event privacy proxy 14 is compromised. Moreover, even if a hacker were able to discern the path followed by one web request/reply, the hacker will not automatically know the path to be followed by a subsequent web request/reply.

By "proxy" transmitting the web request from privacy proxy 14, provider directory 16 and/or web services provider (s) 18 are led to believe that privacy proxy 14 is the originator of the web request. Thus, the identity of client 10 is concealed (even from privacy proxy 14, as explained above). In addition, because all web requests are proxied in this manner, numerous individual requests originating from different clients all appear to come from privacy proxy 14. Thus, the relationship or pattern between the individual clients making the web requests and the content of those requests is no longer discernible to web services provider(s) 18, and/or provider directory 16, and/or eavesdroppers observing data in transit among said entities.

Figure 3:
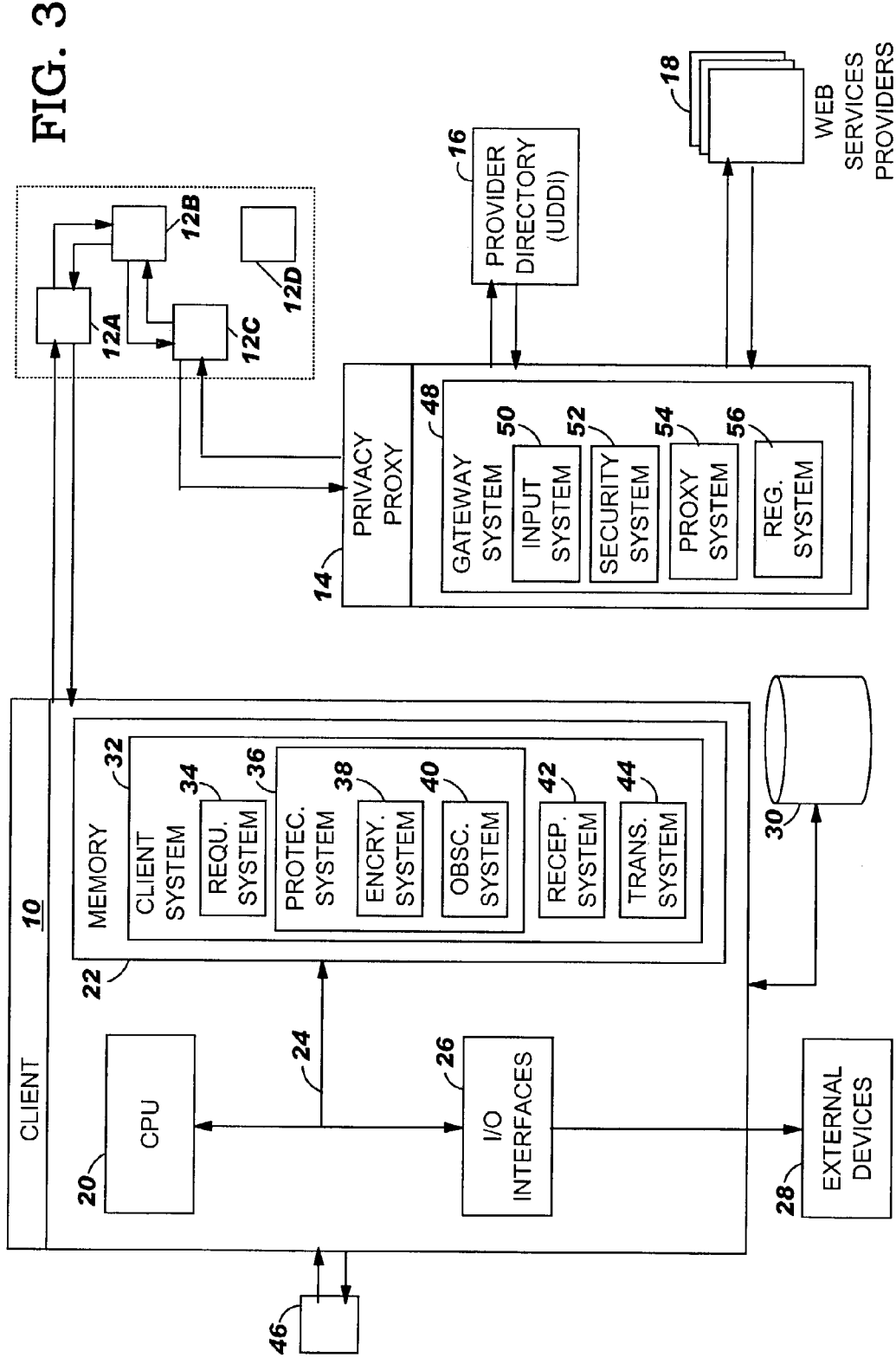
FIG. 3 depicts a more detailed diagram of the system of FIG. 1.

Referring now to FIG. 3, a more detailed depiction of the present invention is shown. As shown, client 10 generally includes central processing unit (CPU) 20, memory 22, bus 24, input/output (I/O) interfaces 26 and external devices/resources 28. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor, facsimile, pager, etc. Bus 24 provides a communication link between each of the components in client 10 and likewise may comprise any known type of transmission link, including electrical, optical, wireless, etc. In addition, although not shown, additional components, such as cache memory, communication systems, system software, etc., may be incorporated into client 10.

Database 30 is optional and could provide storage for information under the present invention. Such information could include, for example, keys, web requests, replies, mappings between original data strings and their obscuring substitutes, etc. As such, database 30 may include one or more storage devices, such as a magnetic disk drive or an optical disk drive. In another embodiment, database 30 includes data distributed across, for example, a local area network (LAN), wide area network (WAN) or a storage area network (SAN) (not shown). Database 30 may also be configured in such a way that one of ordinary skill in the art may interpret it to include one or more storage devices.

It should be understood that communication among client 10, echo peers 12A-D, privacy proxy 14, provider directory 16 and web providers 18 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. It should also be understood that although not shown for brevity purposes, echo peers 12A-D, privacy proxy 14, provider directory 16 and web services provider 18 can include computerized components (e.g., CPU, memory, database, etc.) similar to client 10.

Stored in memory 22 of client 10 (and optionally on echo peers 12A-D) is client system 32, which generally includes request system 34, protection system 36 having encryption system 38 and obscuring system 40, reception system 42 and transmission system 44. As indicated above, user 46 generates a web request using client 10. To this extent, request system 34 could include any known system (e.g., interface, protocol, etc.) for generating and/or expressing a web request, including but not limited to HTTP and SOAP. Once created, the data in the web request can be obscured via obscuring system 40 (e.g., replace original data with "dummy" data) and encrypted via encryption system 38. As indicated above, encryption can be accomplished by any suitable known method, such that the data can be encrypted by client 10 and decrypted only by privacy proxy 14, while remaining private from any intermediaries it traverses including but not limited to conventional network components (not shown) and relay peers 12A-D. In one embodiment, the data in the web request is encrypted with a symmetric key (e.g., as may be stored in encryption system 38 and/or database 30), which itself is encrypted with an asymmetric public key corresponding to the private key of privacy proxy 14. The public key can be obtained from privacy proxy 14, along with a list of relay peers 12A-D upon registration or query by client 10. Once the symmetric key is encrypted, request system 34 can package it with the web request and a hop count representing a random quantity of relay peers 12A-C to be traversed en route to privacy proxy 14.

In another embodiment, the web request is encrypted via a variant of SSL in which an initial communication that includes a hop count and an SSL initiation message is relayed to privacy proxy 14. Once received by privacy proxy 14, a full duplex channel is established traversing the randomly-chosen quantity of relay peers 12A-D, and a symmetric key is negotiated between client 10 and privacy proxy 14, traversing but undecipherable by the quantity of relay peers comprising the path of the full duplex channel. The negotiated symmetric key is then used, at the encryption subsystem 38 in client 10, to encrypt the web request, which is subsequently transmitted over the established full duplex channel (e.g., without the hop count or the encrypted symmetric key).

Regardless of the choice of suitable encryption techniques, the protected web request is relayed via transmission system 44 along a random path of a random quantity of echo peers 12A-D as described above. Specifically, the hop count dictates the quantity of echo peers that the protected web request must traverse en route to privacy proxy 14. When a particular echo peer (e.g., 12B) receives the protected web request with a hop count of greater than "0," it randomly selects another echo peer from the set of echo peers 12A-D (e.g., 12C) and decrements the hop count by "1." Also shown in client system 32 is reception system 42. Reception system 42 receives all communications from outside sources. This may include, among other things, indecipherable protected web requests received from other peers (e.g., if client 10 is an "echo peer") for relaying, and provider replies received from privacy proxy 14.

Once the protected web request has been randomly relayed through a quantity of peers 12A-D (i.e., peers 12A-C in the example depicted), it is received by input system 50 of gateway system 48. Upon receipt, security system 52 decrypts the encrypted data. To accomplish this, privacy proxy 14 could utilize a private key corresponding to the public key employed by client 10 in the client's encryption step to decrypt the symmetric key in the case of a first alternate embodiment (if not already known such as through an SSL negotiation relayed across the quantity of peers in a second alternate embodiment). Once determined, the privacy proxy 14 uses the symmetric key to decrypt the web request. After decryption, proxy system 54 proxies the web request. As previously indicated, proxying of the web request could involve generation of a new web request or altering of the decrypted web request such that it appears to originate from the privacy proxy 14. In any event, proxy system 54 could optionally proxy the web request first to provider directory 16, and then wait for a directory reply that identifies at least one appropriate web services provider 18. Once the directory reply is received (e.g., by input system 50), the web request is proxied to the identified web services provider 18, which may return a provider reply. Once input system 50 has received the provider reply, security system 52 encrypts the reply, and proxy system 54 (or some other "output system" within gateway system 48) relays the encrypted provider reply back to client 10 via the set of echo peers 12A-C, a quantity of which is randomly chosen from the set of echo peers 12A-D. As indicated above, the relaying of the provider reply to client 10 can take many forms. For example, the provider reply could be returned along a session that was formed when the web request was originally relayed from client 10. Alternatively, privacy proxy 14 and echo peers 12A-C could each "remember" the source from which the corresponding web request was received, and relay the provider reply along that path. As a third alternative, a new random path for relaying the reply from the privacy proxy 14 to the client 10 through a randomly-chosen quantity of echo peers 12A-D could be established, so long as a suitable encryption method is used to protect the reply data and allow its decryption only by client 10.

Once client 10 receives the provider reply, encryption system 38 decrypts the same, and obscuring system 40 un-obscures any corresponding data therein as may be necessary to restore data strings that may previously have been obscured at client 10 to their original values. As indicated above, un-obscuring could involve re-inserting any data (i.e., replacing the "dummy" data with the original data) that was removed from the web request before its random relaying to privacy proxy 14.

Also shown in gateway system 48 is registration system 56, which coordinates the registration of client 10 and/or echo peers 12A-D, and transmits peer lists and optionally public keys thereto. Specifically, as indicated above, client 10 and/or echo peers 12A-D could be made to register with privacy proxy 14 before utilizing the services described herein. Upon registration each client 10 and/or echo peers 12A-D could be issued a list of peers for use by said client and said peers in performing the random relay function, as well as an asymmetric public key corresponding to a private key possessed by the privacy proxy 14 for subsequent use at said client in encrypting a symmetric key according to this invention. Periodically, client 10 and/or echo peers 12A-D could be made to renew their registrations so that the list of peers could be updated.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls client 10, echo peers 12A-D, privacy proxy 14, provider directory 16 and web providers 18 such that each system carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for privately communicating web requests, comprising:

obscuring a web request data at a client, wherein the obscuring includes substituting at least a value for at least a confidential string of data in a data payload portion of the web request;

initiating a communication from the client to a privacy proxy, wherein the communication includes a hop count and an SSL initiation message, and wherein the hop count identifies a quantity of peers in a set of peers through which the web request is randomly relayed;

establishing a full duplex channel between the privacy proxy and the client;

encrypting a data payload portion of the web request on a client with a symmetric key;

subsequent to the encrypting, randomly relaying the web request to the privacy proxy along the established channel independently of the hop count and the symmetric key;

decrypting the web request on the privacy proxy;

automatically proxying the web request from the privacy proxy to a corresponding web services provider;

proxying the web request to a provider directory, prior to automatically proxying the web request to the corresponding web services provider;

receiving a directory reply on the privacy proxy, wherein the directory reply identifies the corresponding web services provider;

receiving and encrypting, on the privacy proxy, a provider reply received from the corresponding web services provider;

relaying the provider reply to the client through a set of peers; and decrypting the provider reply on the client.

2. The method of claim 1, further comprising: un-obscuring obscured data in the provider reply on the client.

3. A program product stored on a computer-readable medium for privately communicating web requests, which when executed, performs the following steps:

creating a web request on a client;

protecting the web request on a client, wherein the protecting includes using a symmetric key and obscuring data, wherein the obscuring includes substituting at least a value for at least a confidential string of data in a data payload portion of the web request;

initiating a communication from the client to a privacy proxy, wherein the communication includes a hop count and an SSL initiation message, wherein the hop count identifies a quantity of peers in a set of peers;

establishing a full duplex channel between the privacy proxy and the client;

randomly relaying the web request to the privacy proxy along the established channel independently of the hop count and the symmetric key;

proxying the web request from the privacy proxy to a provider directory;

receiving a directory reply that identifies a corresponding web services provider; and automatically proxying the web request from the privacy proxy to the corresponding web services provider.

4. The program product of claim 3, wherein the protecting step un-obscures obscured data in a provider reply.

5. The program product of claim 3, wherein the protecting step further decrypts an encrypted reply received from the privacy proxy.

6. The program product of claim 3, further comprising receiving a reply to the web request.

7. The program product of claim 3, wherein the program product is loaded on the client.

* * * * *